(12) United States Patent
Gaese et al.

(10) Patent No.: US 6,257,582 B1
(45) Date of Patent: Jul. 10, 2001

(54) METHOD FOR MANUFACTURING TARGET OBJECTS FOR SPORT PRACTICE SHOOTING AND SPORT SHOOTING COMPETITIONS AND TARGET OBJECTS MANUFACTURED ACCORDING TO THIS METHOD

(76) Inventors: Dagmar Gaese, Tulpenweg 16, D-51503 Rösrath; Ehrhard Schilling, Kastanienallee 20; Klaus Wödy, Speestrasse 8, both of D-50937 Köln, all of (DE)

( * ) Notice: Subject to any disclaimer, the term of this patent is extended or adjusted under 35 U.S.C. 154(b) by 0 days.

(21) Appl. No.: 09/415,681

(22) Filed: Oct. 8, 1999

(30) Foreign Application Priority Data

Oct. 10, 1998 (DE) ............................................. 198 46 782

(51) Int. Cl.⁷ ........................................................ F41J 9/16
(52) U.S. Cl. ............................................................ 273/363
(58) Field of Search ..................................... 273/362, 363, 273/364, 365, 366; 106/406, 416

(56) References Cited

U.S. PATENT DOCUMENTS

| | | | |
|---|---|---|---|
| 2,831,778 | * 4/1958 | Allison et al. ........................ | 273/362 |
| 4,568,087 | * 2/1986 | Schreiner-Hansen ................ | 273/362 |
| 4,623,150 | * 11/1986 | Moehlman et al. ................. | 273/362 |
| 5,389,142 | * 2/1995 | Moore .................................. | 273/363 |
| 5,467,998 | * 11/1995 | Hellings .............................. | 273/363 |
| 5,651,550 | * 7/1997 | LaVorgna et al. .................... | 273/363 |
| 5,947,475 | * 9/1999 | Skeuse et al. ....................... | 273/363 |
| 5,967,521 | * 10/1999 | Hellings .............................. | 273/363 |

* cited by examiner

Primary Examiner—Mark S. Graham
(74) Attorney, Agent, or Firm—Robert W. Becker & Associates

(57) ABSTRACT

The present invention relates to a method for manufacturing target objects for sport practice shooting and sport shooting competitions, wherein clay and/or rock flour as a base material is mixed with a bonding agent and other additives for manufacturing a preliminary product which is subsequently shaped into the target object, whereby the mix comprises 30–70 weight percent base material, 10–40 weight percent gypsum, 10–20 weight percent grain flour, sufficient water and further liquid and/or semi-liquid additives resulting in a pasty mix which is formed by extruding and subsequent drying to a preliminary product or to the finished target object.

16 Claims, No Drawings

METHOD FOR MANUFACTURING TARGET
OBJECTS FOR SPORT PRACTICE
SHOOTING AND SPORT SHOOTING
COMPETITIONS AND TARGET OBJECTS
MANUFACTURED ACCORDING TO THIS
METHOD

BACKGROUND OF THE INVENTION

The present invention relates to a method for manufacturing target objects for sport practice shooting and sport shooting competitions, wherein clay and/or rock flour as a base material is mixed with a bonding agent and other additives for manufacturing a preliminary product which is subsequently shaped into the target object.

Environmentally polluting carbon or petroleum pitch are usually utilized as a base and hardening material, which results, due to the polycyclic aromatic hydrocarbons (PAH), in a significant environmentally impacting potential. For example, older target objects of this kind contain up to 2% of this environmentally polluting material group, which led to PAH levels of up to 1000 mg/kg base within the target deposition zone of existing shooting ranges. The base therefore has to be treated as toxic waste.

By partially substituting PAH-containing bonding agents by ecologically safe materials, it has been possible to manufacture target objects of the kind discussed herein with a significantly lowered PAH-level (total levels EPA 16<50 ppm). In spite of this improvement, this could not change the fact that on shooting ranges which have been in operation for a long time a significant pollution potential still exists because of great quantities of throw-disc fragments.

Therefore, it is an object of the present invention to provide a method for manufacturing target objects of the kind discussed herein and to provide target objects manufactured according to this method without using PAH-containing binding agents.

SUMMARY OF THE INVENTION

This object is solved by the inventive method by processing a mix of
  30–70 weight percent base material,
  10–40 weight percent gypsum,
  10–20 weight percent grain flour,
adding a sufficient quantity of water and further liquid and/or semi-liquid additives to produce a pasty mix which is formed by extruding and subsequently drying to a preliminary product or to the finished end product.

Surprisingly, it has been found that gypsum, especially in connection with grain flour, is capable to fulfill the function as a binding agent and furthermore to ensure, because of its specific density, the necessary density of the target object in the order of magnitude of 1.9 to 2.0 which is required in order to achieve stabile aerodynamical qualities of the target object.

The grain flour furthermore has the function of a cell filler. Preferably, a so-called 45 flour is utilized. The grain flour acts as a decomposition aid of fragments of the target object or throw-discs deposited on the ground. This function can still be supported or improved by the addition of straw defined by the particle size. Added straw shall be fine-ground and shall have a fiber length of $\leq 2$ mm relative to the fiber portion in order to prevent a re-enforcing effect which may negatively affect the fracturing of the target objects or throw-discs. The proportion of straw shall amount to 5 weight percent maximally.

In order to improve the processability of the material to be extruded vegetable oils are added in a quantity of 2–5 and preferably 3–4 weight percent in order to smoothen the pasty mix. Soybean oil has the quality of an increased temperature stability while rape seed or Canola oil which is not as temperature stable decreases the manufacturing costs. Approximately 2–4 weight percent of marc and/or molasses can be added as an additional binding agent.

The clay utilized as base material having a preferable kaolin proportion of up to 100 weight percent shall preferably have a particle size of $\leq 2$ μm.

The individual components are roughly mixed in a first step with the actual mixing process occurring subsequently within the extruder. Additional water is added to the extruder along its entire length in dependence of the specific composition of the mush or mix and also as a temperature controller. Preferably, an extruder is utilized which is equipped with a material intake stage, a subsequent compression stage operating against a resistance and a subsequent expansion stage. Within the extruding step it needs to be observed that the temperature of the mix is set to maximally 160° C., preferably 125–140° C.

According to the invention, the expansion step can be followed by an injection molding step in which the finished target object, e.g., a throw-disc, sliding disc, roller body, or the like can be directly manufactured with the necessary dimensions.

However, it is also possible to first manufacture a granule-like preliminary product which can be stored for further processing. When the finished target object shall be manufactured out of this granule-like preliminary product by means of an extruder of the above described kind by adding liquid it can be useful and advantageous to separate dust particles from this preliminary product.

Preferably the extruder is fed with a mix of
  50–65 weight percent, especially approximately 60 weight percent, base material,
  10–20 weight percent, preferably approximately 15 weight percent, gypsum,
  13–17 weight percent, preferably approximately 15 weight percent, grain flour,
with a water proportion of 2–3 weight percent, a proportion of 3–4 weight percent vegetable oil and a proportion of molasses/marc of 2–4 weight percent.

The invention also relates to the target object manufactured according to the above described method.

The present invention is, of course, in no way restricted to the specific disclosure of the specification, but also encompasses any modifications within the scope of the appended claims.

What is claimed is:

1. A method for manufacturing target objects for sport practice shooting and sport shooting competitions, comprising the steps of:
  mixing a mush containing 30–70 weight percent of at least one of the group of clay and rock flour as a base material with 10–40 weight percent gypsum and 10–20 weight percent grain flour as bonding agents, water and at least one of the group consisting of liquid and semi-liquid additives;
  subsequently extruding said mush;
  subsequently drying said mush to create a preliminary product or a finished target object.

2. A method for manufacturing target objects according to claim 1, wherein said at least one of the group of liquid and semi-liquid additives comprises approximately 2–5 weight percent, preferably 3–4 weight percent, vegetable oil.

3. A method for manufacturing target objects according to claim 2, wherein said vegetable oil is soybean oil.

4. A method for manufacturing target objects according to claim 2, wherein said vegetable oil is rape seed oil.

5. A method for manufacturing target objects according to claim 1, wherein said at least one of the group of liquid and semi-liquid additives comprises approximately 2–4 weight percent of at least one of the group consisting of marc and molasses.

6. A method for manufacturing target objects according to claim 1, wherein said base material is clay with a particle size of $\leq 2$ μm.

7. A method for manufacturing target objects according to claim 6, wherein said clay has a kaolin proportion of up to 100 weight percent.

8. A method for manufacturing target objects according to claim 1, wherein said grain flour is rye flour.

9. A method for manufacturing target objects according to claim 1, wherein the step of mixing a mush further comprises adding maximally 5 weight percent fine-ground straw having a fiber length of $\leq 2$ mm.

10. A method for manufacturing target objects according to claim 1, wherein the step of mixing individual components of said mush occurs within an extruder.

11. A method for manufacturing target objects according to claim 10, wherein said extruder is equipped with a material intake stage, a subsequent compression stage operating against a resistance, and a subsequent expansion stage.

12. A method for manufacturing target objects according to claim 11, wherein said expansion stage is followed by an injection molding and extruding stage.

13. A method for manufacturing target objects according to claim 10, wherein a temperature of said mush within said extruder is set to maximally 160° C., preferably to 125–140° C.

14. A method for manufacturing target objects according to claim 12, wherein the step of injection-molding and extruding forms a preliminary product, and which includes the further step of separating dust particles from said preliminary product.

15. A method for manufacturing target objects according to claim 1, wherein said step of mixing a mush comprises feeding to a mixing extruder 50–65 weight percent, especially approximately 60 weight percent, base material, 10–20 weight percent, preferably approximately 15 weight percent, gypsum, 13–17 weight percent, preferably approximately 15 weight percent, grain flour, and a water proportion of 2–3 weight percent, a proportion of 3–4 weight percent vegetable oil and a proportion of 2–4 weight percent marc.

16. A target object for sport practice shooting and sport shooting competitions, comprising:

a mush containing 30–70 weight percent of at least one of the group consisting of clay and stone flour as a base material, 10–40 weight percent gypsum and 10–20 weight percent grain flour as bonding agents, water and at least one of the group consisting of liquid and semi-liquid additives, wherein said mush was extruded and dried to form a target object.

* * * * *

UNITED STATES PATENT AND TRADEMARK OFFICE
CERTIFICATE OF CORRECTION

PATENT NO.     : 6,257,582 B1
DATED          : July 10, 2001
INVENTOR(S)    : Gaese et al.

It is certified that error appears in the above-identified patent and that said Letters Patent is hereby corrected as shown below:

<u>Title page,</u>
Item [73] should be added as follows:

[73] Assignee: Raiffeisen-Waren-Zentrale Rhein-Main eG
Altenberger Strasse 1a
D-50668 Köln
Germany Signed and Sealed this Ninth Day of July, 2002

*Attest:*

*Attesting Officer*

JAMES E. ROGAN
*Director of the United States Patent and Trademark Office*